(12) United States Patent
Tokunaga

(10) Patent No.: US 7,627,256 B2
(45) Date of Patent: Dec. 1, 2009

(54) METHOD AND SYSTEM FOR WAVELENGTH DIVISION MULTIPLEXED OPTICAL SIGNAL TRANSMISSION AND OPTICAL REPEATER

(75) Inventor: Koichi Tokunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 369 days.

(21) Appl. No.: 11/168,332

(22) Filed: Jun. 29, 2005

(65) Prior Publication Data

US 2005/0286899 A1    Dec. 29, 2005

(30) Foreign Application Priority Data

Jun. 29, 2004  (JP) .............................. 2004-191321

(51) Int. Cl.
*H04B 10/00*   (2006.01)
(52) U.S. Cl. ..................... 398/175; 398/181; 398/173; 398/97
(58) Field of Classification Search ......... 398/173–184, 398/97
See application file for complete search history.

(56) References Cited

U.S. PATENT DOCUMENTS 7,116,908 B2 * 10/2006 Uda et al. ..................... 398/94

FOREIGN PATENT DOCUMENTS

| JP | 10-303816 | 11/1998 |
|---|---|---|
| JP | 10-303823 | 11/1998 |
| JP | 2001-168841 | 6/2001 |
| JP | 2001-7829 | 12/2001 |
| JP | 2002-250947 | 9/2002 |
| JP | 2003-174421 | 6/2003 |

OTHER PUBLICATIONS

Japanese Office Action in corresponding Japanese Application No. 2004-191321 filed Jun. 29, 2004.

* cited by examiner

*Primary Examiner*—Agustin Bello
(74) *Attorney, Agent, or Firm*—Young & Thompson

(57) ABSTRACT

A wavelength division multiplexed optical signal transmission method, a wavelength division multiplexed optical signal transmission system and an optical repeater enabling the number of wavelengths to be detected without error even when optical noise is caused in the optical repeater and such functions as adjustment and monitoring of the level of a wavelength division multiplexed optical signal to be performed properly. An optical repeater processes controlled optical signals of different wavelengths individually based on a control optical signal that contains wavelength number information indicating the total number of wavelengths and the presence or absence of a controlled optical signal with respect to each wavelength. Thus, even when optical noise is caused in the optical repeater, the number of wavelengths can be detected without error and such functions as adjustment and monitoring of the level of a wavelength division multiplexed optical signal can be performed properly.

15 Claims, 12 Drawing Sheets

FIG. 5

| D21 | D22 | D23 | D24 | D25 | ... | D2n | D2T |
|---|---|---|---|---|---|---|---|
| PRESENCE/ABSENCE OF SIGNAL OF FIRST WAVELENGTH | PRESENCE/ABSENCE OF SIGNAL OF SECOND WAVELENGTH | PRESENCE/ABSENCE OF SIGNAL OF THIRD WAVELENGTH | PRESENCE/ABSENCE OF SIGNAL OF FOURTH WAVELENGTH | PRESENCE/ABSENCE OF SIGNAL OF FIFTH WAVELENGTH | | PRESENCE/ABSENCE OF SIGNAL OF n-TH WAVELENGTH | TOTAL NUMBER OF WAVELENGTHS |

F I G. 12
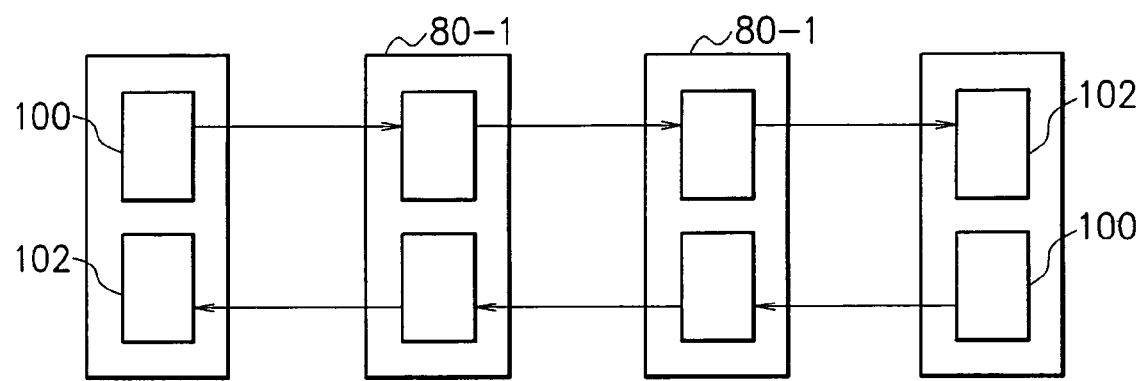

METHOD AND SYSTEM FOR WAVELENGTH DIVISION MULTIPLEXED OPTICAL SIGNAL TRANSMISSION AND OPTICAL REPEATER

FIELD OF THE INVENTION

The present invention relates to a wavelength division multiplexed optical signal transmission method, a wavelength division multiplexed optical signal transmission system, and an optical repeater.

BACKGROUND OF THE INVENTION

A description will be given of a conventional wavelength division multiplexed (hereinafter referred to as WDM) optical signal transmission system with reference to FIG. 1.

As shown in FIG. 1, the conventional WDM optical signal transmission system comprises a wavelength multiplexer 100 as an upstream device, an optical repeater 900, and a wavelength demultiplexer 102 as a downstream device. The WDM optical signal transmission system is provided with optical fibers 7-1 and 7-2 in the route from the wavelength multiplexer 100 to the wavelength demultiplexer 102 to transmit WDM optical signals.

There may be disposed a plurality of the optical repeaters 900 depending on the length of a transmission line or the attenuation in the level of a received optical signal. The optical repeater 900 is capable of diverting an arbitrary optical signal to an external interface as well as wavelength multiplexing optical signals newly received from the external interface.

In FIG. 1 illustrating the wavelength multiplexer 100, optical repeater 900, and wavelength demultiplexer 102, the reference numeral 1-1 represents external interface signal receiving sections. Each of the external interface signal receiving sections 1-1 receives an optical signal from an opposite device and converts it to a signal having an arbitrary wavelength. Any device may serve as the opposite device so long as it deals with signals that can be interfaced with the external interface signal receiving section 1-1 and an external interface signal transmitting section 6-1. Examples of the opposite device include an STM (Synchronous Transfer Mode) transmitter dealing with STM signals, an ATM (Asynchronous Transfer Mode) transmitter, and a router dealing with gigabit signals on the Internet, etc. The wavelength multiplexer and demultiplexer may constitute opposite devices. The wavelength multiplexer and demultiplexer do not controls respective interface signals and restore their wavelengths to their original conditions when outputting them. The reference numerals 2-1 and 2-2 represent wavelength multiplexing sections. Having received optical signals of n wavelengths λ1 to λn obtained by the external interface signal receiving sections 1-1, the wavelength multiplexing section 2-1 or 2-2 generates a WDM optical signal and adjust the optical level according to the number of the wavelengths to send it to the transmission line. Further, the reference numerals 3, 3-1 and 3-3 represent wavelength number information managing sections for managing the number of wavelengths of optical signals wavelength multiplexed into a WDM optical signal.

"The number of wavelengths" (also referred to as the total number of wavelengths) herein indicates the number of optical signals multiplexed into a WDM optical signal. For example, when 16 optical signals are multiplexed, optical signals of 16 different wavelengths are multiplexed. Similarly, when 40 optical signals are multiplexed, optical signals of 40 different wavelengths are multiplexed. Besides, "wavelength" sometimes indicates each of optical signals multiplexed into a WDM optical signal. Respective optical signals are converted to signals having arbitrary wavelengths, and there exist no optical signals having the same wavelength. Further, "transmission" does not mean radio transmission, but it means the transmission of electrical signals through an internal bus or the transmission of a WDM signal through an optical fiber.

The reference numerals 4-1 and 4-2 represent wavelength demultiplexing sections. Having received a WDM optical signal from the transmission line, the wavelength demultiplexing section 4-1 or 4-2 adjusts the optical level according to the number of the wavelengths and demultiplexes the signal into signals having different wavelengths. The reference numeral 5-1 represents wavelength repeating sections for compensating a deteriorated signal to restore it to its original quality. The reference numeral 6-1 represents an external interface signal transmitting section. The external interface signal transmitting section 6-1 transmits a signal to an opposite device. The reference numerals S1 and S2 represent WDM optical signals.

In, for example, Japanese Patent Applications laid open No. HEI10-303823 and No. 2001-7829, there have been described techniques for transmitting information on the number of wavelengths with such devices as the wavelength multiplexer 100, optical repeater 900, and wavelength demultiplexer 102.

The conventional techniques, however, have the following problems.

The first problem is that, the information on the number of wavelengths (hereinafter referred to as wavelength number information), which is sent from the wavelength multiplexer to the optical repeater, indicates only the total number of wavelengths. Besides, the wavelength number information is simply created based on input levels in each single device regardless of settings for respective wavelengths.

The second problem is that, when a plurality of optical repeaters are connected in series as shown in FIG. 2, or intervals between wavelengths to be multiplexed are narrow, an error occurs in detection.

FIG. 2 is a diagram showing a plurality of optical repeaters connected in series.

Particularly, in such a system, with a plurality of optical repeaters 900-1, 900-2, ..., 900-n being connected in series, as shown in FIG. 2, an error easily occurs in detection. Therefore, a system capable of preventing erroneous detection is desired.

FIG. 3(a) is a diagram showing the row of wavelengths to be multiplexed. FIG. 3(b) is a diagram showing a part depicted in FIG. 3(a) on larger scale. In both the drawings, the horizontal axis indicates wavelength (nm) while the vertical axis indicates optical signal level (dB).

As can be seen in FIG. 3(b), in the case of the system comprising a plurality of the optical repeaters connected in series, the waveform of a WDM optical signal distorts as indicated by the dotted line N, which causes optical noise in a WDM optical signal. Provided that the intensity of optical noise is Ln, an increase in Ln causes a false representation of an optical signal with a wavelength (λX in FIG. 3(b)), at which originally no signal is present, when a WDM optical signal is demultiplexed. Thus, the number of wavelengths may be erroneously detected.

That is, according to the conventional techniques, since the wavelength number information is created based on only the presence or absence of optical signals to be wavelength multiplexed, the number of wavelengths is erroneously detected when optical noise is caused in the optical repeater. Consequently, such functions as adjustment and monitoring of the level of a WDM optical signal can be performed erroneously or unusually.

SUMMARY OF THE INVENTION

It is therefore an object of the present invention to provide a wavelength division multiplexed optical signal transmission method, a wavelength division multiplexed optical signal transmission system, and an optical repeater for detecting the number of wavelengths without error even when optical noise is caused in an optical repeater as well as performing such functions as adjustment and monitoring of the level of a wavelength division multiplexed optical signal properly.

In accordance with the first aspect of the present invention, to achieve the object mentioned above, there is provided a wavelength division multiplexed optical signal transmission method for transmitting via one or more optical repeaters a wavelength division multiplexed optical signal composed of a control optical signal and a plurality of controlled optical signals from an upstream device to a downstream device through optical fibers, the method comprising the steps of:

in the optical repeater, demultiplexing a wavelength division multiplexed optical signal transmitted from the upstream device into optical signals each having a different wavelength;

processing the controlled optical signals of different wavelengths individually based on the control optical signal that contains wavelength number information indicating the presence or absence of a controlled optical signal with respect to each wavelength;

remultiplexing the control optical signal and the controlled optical signals that have undergone the processing to obtain a wavelength division multiplexed optical signal; and transmitting the wavelength division multiplexed optical signal to the downstream device.

In accordance with the second aspect of the present invention, there is provided a wavelength division multiplexed optical signal transmission method in which a plurality of optical repeaters connected in a ring by optical fibers transmit a wavelength division multiplexed optical signal composed of a control optical signal and a plurality of controlled optical signals from one to another in one direction, the method comprising the steps of:

in the optical repeater, demultiplexing a wavelength division multiplexed optical signal transmitted from an upstream optical repeater into optical signals each having a different wavelength;

processing the controlled optical signals of different wavelengths individually based on the control optical signal that contains wavelength number information indicating the presence or absence of a controlled optical signal with respect to each wavelength;

remultiplexing the control optical signal and the controlled optical signals that have undergone the processing to obtain a wavelength division multiplexed optical signal; and transmitting the wavelength division multiplexed optical signal to a downstream optical repeater.

In accordance with the third aspect of the present invention, there is provided a wavelength division multiplexed optical signal transmission method for transmitting wavelength division multiplexed optical signals each composed of a control optical signal and a plurality of controlled optical signals in opposite directions through transmission lines by a plurality of optical repeaters each having a pair of optical repeater units, ones of the repeater unit pairs in the respective optical repeaters being connected by optical fibers to form a ring transmission line and the others also being connected by optical fibers to form a ring transmission line, or ones of the repeater unit pairs in the respective optical repeaters being connected by optical fibers to form a straight transmission line, the others also being connected by optical fibers to form a straight transmission line and optical repeater units at both ends being connected to an upstream device and a downstream device, respectively, the method comprising the steps of:

in the optical repeater unit, demultiplexing a wavelength division multiplexed optical signal transmitted from an upstream optical repeater unit into optical signals each having a different wavelength;

processing the controlled optical signals of different wavelengths individually based on the control optical signal that contains wavelength number information indicating the presence or absence of a controlled optical signal with respect to each wavelength;

remultiplexing the control optical signal and the controlled optical signals that have undergone the processing to obtain a wavelength division multiplexed optical signal; and transmitting the wavelength division multiplexed optical signal to a downstream optical repeater unit.

In accordance with the fourth aspect of the present invention, there is provided a wavelength division multiplexed optical signal transmission system comprising an upstream device, one or more optical repeaters and a downstream device for transmitting via the optical repeater a wavelength division multiplexed optical signal composed of a control optical signal and a plurality of controlled optical signals from the upstream device to the downstream device through optical fibers, wherein:

the upstream device includes a receiver for receiving a control optical signal and controlled optical signals and a multiplexer for multiplexing the control optical signal and the controlled optical signals received by the receiver;

the optical repeater includes a demultiplexer for demultiplexing a wavelength division multiplexed optical signal transmitted from the upstream device into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals; and the downstream device includes a demultiplexer for demultiplexing a wavelength division multiplexed optical signal transmitted from the optical repeater and a transmitter for transmitting a control optical signal and controlled optical signals obtained by demultiplexing the wavelength division multiplexed optical signal to the outside.

In accordance with the fifth aspect of the present invention, there is provided a wavelength division multiplexed optical signal transmission system comprising a plurality of optical repeaters connected in a ring by optical fibers which transmit a wavelength division multiplexed optical signal composed of a control optical signal and a plurality of controlled optical signals from one to another in one direction, wherein the optical repeater includes a demultiplexer for demultiplexing a wavelength division multiplexed optical signal transmitted from an upstream optical repeater into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals to transmit a wavelength division multiplexed optical signal to a downstream optical repeater.

In accordance with the sixth aspect of the present invention, there is provided a wavelength division multiplexed optical signal transmission system comprising a plurality of optical repeaters each having a pair of optical repeater units which transmit wavelength division multiplexed optical signals each composed of a control optical signal and a plurality of controlled optical signals in opposite directions through transmission lines, wherein:

ones of the repeater unit pairs in the respective optical repeaters are connected by optical fibers to form a ring transmission line, and the others are also connected by optical fibers to form a ring transmission line; or ones of the repeater unit pairs in the respective optical repeaters are connected by optical fibers to form a straight transmission line, the others are also connected by optical fibers to form a straight transmission line, and optical repeater units at both ends are connected to an upstream device and a downstream device, respectively; and the optical repeater unit includes a demultiplexer for demultiplexing a wavelength division multiplexed optical signal transmitted from an upstream optical repeater unit into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals that have undergone the processing by the processor.

In accordance with the seventh aspect of the present invention, there is provided an optical repeater for transmitting a wavelength division multiplexed optical signal composed of a control optical signal and a plurality of controlled optical signals from the upstream device to the downstream device through optical fibers, the optical repeater comprising:

a demultiplexer for demultiplexing a wavelength division multiplexed optical signal transmitted from the upstream device into optical signals each having a different wavelength;

a processor for processing the controlled optical signals of different wavelengths individually based on the control optical signal that contains wavelength number information indicating the presence or absence of a controlled optical signal with respect to each wavelength; and a multiplexer for remultiplexing the control optical signal and the controlled optical signals.

In accordance with the eighth aspect of the present invention, there is provided an optical repeater applied to a wavelength division multiplexed optical signal transmission system comprising a plurality of the optical repeaters connected in a ring by optical fibers which transmit a wavelength division multiplexed optical signal composed of a control optical signal and a plurality of controlled optical signals from one to another in one direction, the optical repeater comprising:

a demultiplexer for demultiplexing a wavelength division multiplexed optical signal transmitted from an upstream optical repeater into optical signals each having a different wavelength;

a processor for processing the controlled optical signals of different wavelengths individually based on the control optical signal that contains wavelength number information indicating the presence or absence of a controlled optical signal with respect to each wavelength; and a multiplexer for remultiplexing the control optical signal and the controlled optical signals to transmit a wavelength division multiplexed optical signal to a downstream optical repeater.

In accordance with the ninth aspect of the present invention, there is provided an optical repeater applied to a wavelength division multiplexed optical signal transmission system comprising a plurality of the optical repeaters each having a pair of optical repeater units which transmit wavelength division multiplexed optical signals each composed of a control optical signal and a plurality of controlled optical signals in opposite directions through transmission lines, wherein:

ones of the repeater unit pairs in the respective optical repeaters are connected by optical fibers to form a ring transmission line, and the others are also connected by optical fibers to form a ring transmission line; or ones of the repeater unit pairs in the respective optical repeaters are connected by optical fibers to form a straight transmission line, the others are also connected by optical fibers to form a straight transmission line, and optical repeater units at both ends are connected to an upstream device and a downstream device, respectively; and the optical repeater unit includes a demultiplexer for demultiplexing a wavelength division multiplexed optical signal transmitted from an upstream optical repeater unit into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals that have undergone the processing by the processor.

In the case where the wavelength number information provides a signal present indication corresponding to a controlled optical signal, when the signal has not deteriorated, the signal may pass through without a change in the signal present indication of the wavelength number information, while, when the signal has deteriorated, the signal may be once terminated and regenerated so that a new controlled optical signal regenerated from the signal can pass through without a change in the signal present indication of the wavelength number information.

On the other hand, in the case where the wavelength number information provides a signal absent indication corresponding to a controlled optical signal, when an optical signal is received from the outside, the optical signal may be output as the controlled optical signal and the wavelength number information is updated to indicate the presence of the signal, while, when no optical signal is received from the outside, the controlled optical signal is terminated without a change in the signal absent indication of the wavelength number information.

Besides, functions for adjustment and monitoring of the level of an input wavelength division multiplexed optical signal may be controlled based on the wavelength number information from the control optical signal.

In addition, the wavelength number information may include information on the number of multiplexed wavelengths.

BRIEF DESCRIPTION OF THE DRAWINGS

The exemplary aspects and features of the present invention will become more apparent from the consideration of the following detailed description taken in conjunction with the accompanying drawings in which:

FIG. 5 is a diagram showing a wavelength number information signal transmitted in the wavelength division multiplexed optical signal transmission system depicted in FIG. 4;

FIG. 12 is a schematic diagram showing a wavelength division multiplexed optical signal transmission system to which is applied a wavelength division multiplexed optical signal transmission method according to yet another embodiment of the present invention.

DESCRIPTION OF THE PREFERRED EMBODIMENTS

Figure 1:
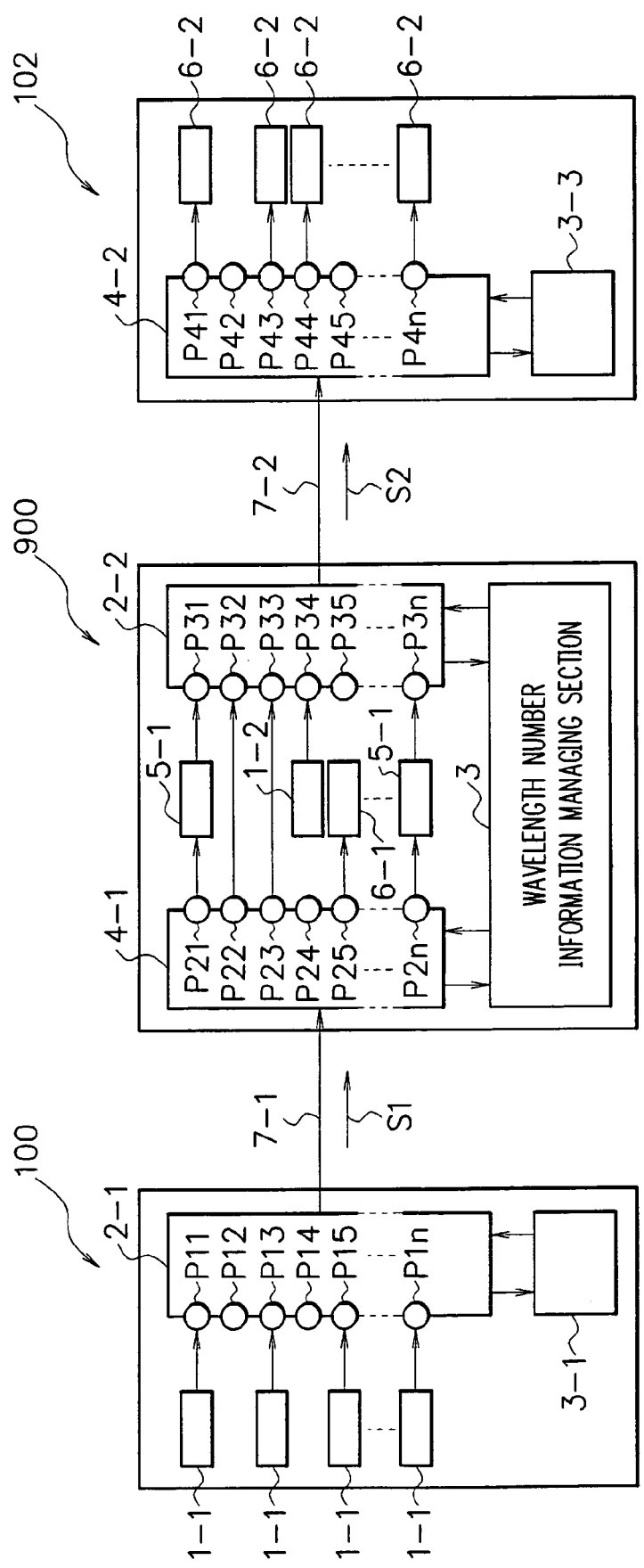
FIG. 1 is a diagram showing a wavelength division multiplexed optical signal transmission system to which is applied a conventional wavelength division multiplexed optical signal transmission method.
Figure 2:
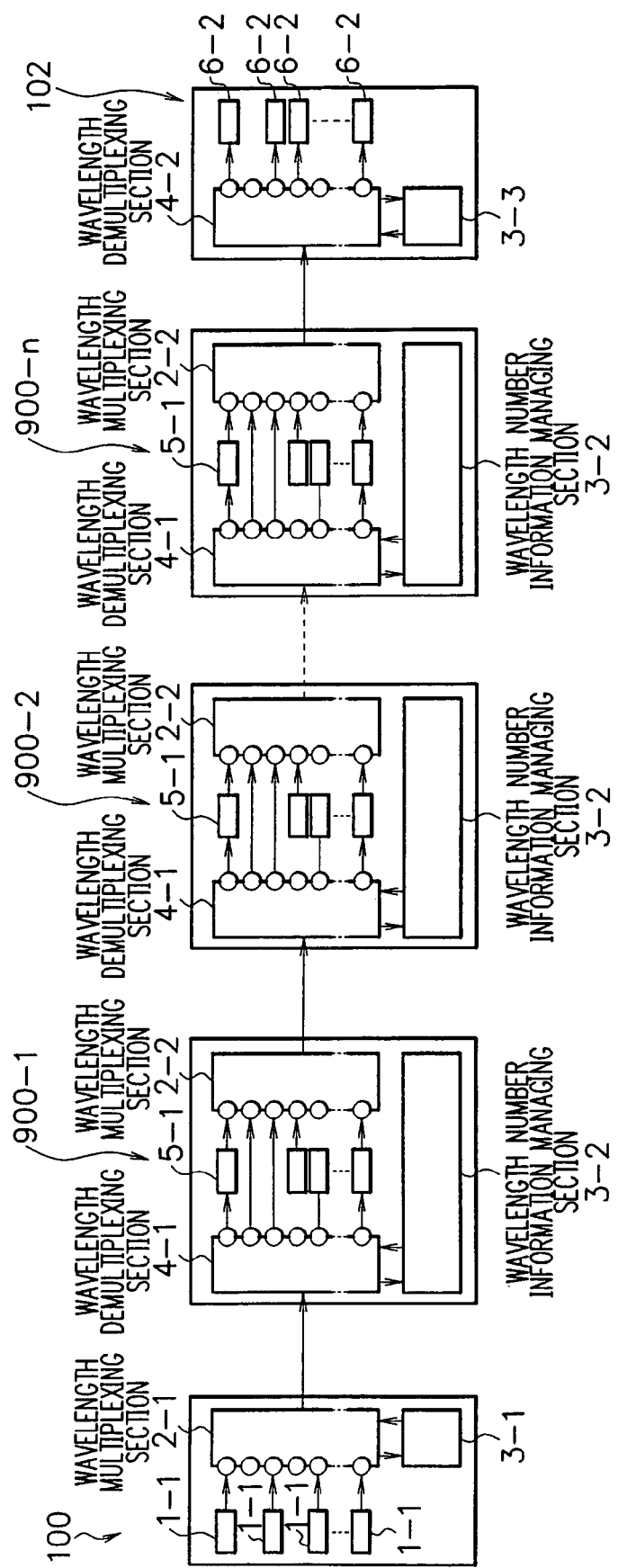
FIG. 2 is a diagram showing a plurality of optical repeaters connected in series.
Figure 3:
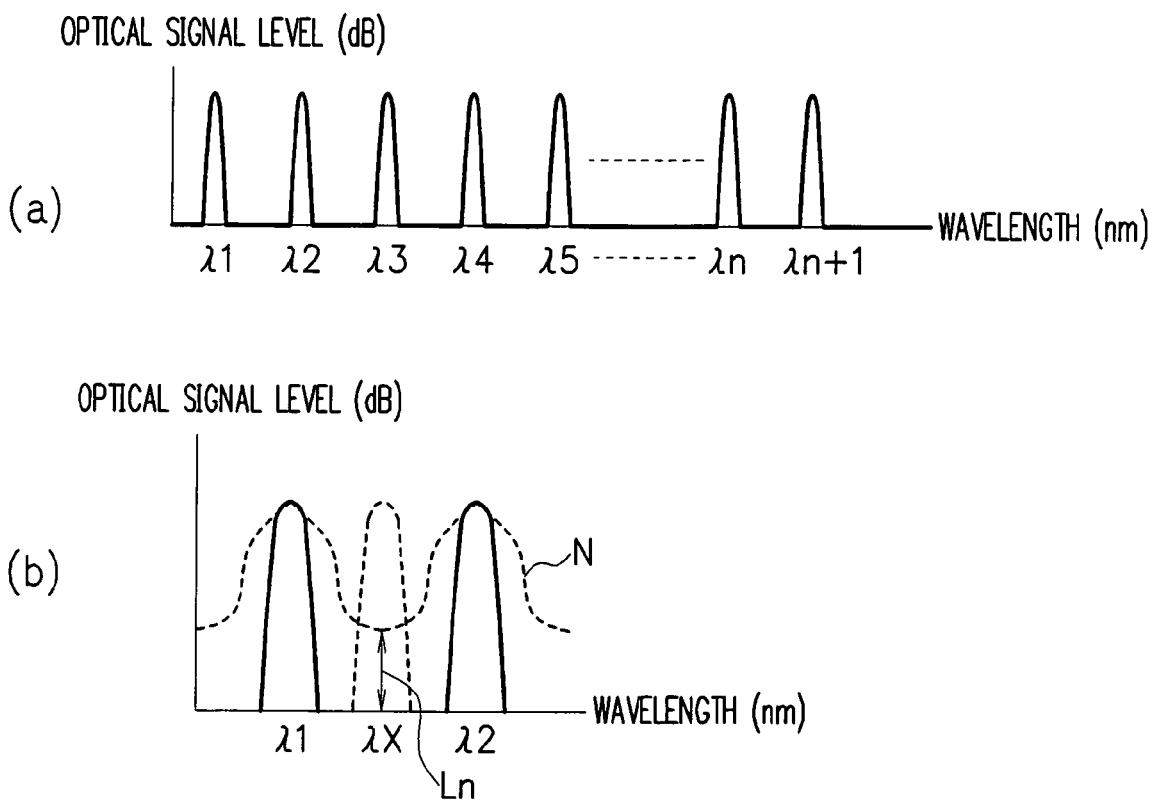
FIG. 3(a) is a diagram showing the row of optical signals to be wavelength-division multiplexed.
FIG. 3(b) is a diagram showing a part depicted in FIG. 3(a) on larger scale.

Referring now to the drawings, a description of preferred embodiments of the present invention will be given in detail.

A wavelength division multiplexed optical signal transmission method, a wavelength division multiplexed optical signal transmission system and an optical repeater of the present invention are aimed at correctly performing such functions as adjustment and monitoring of the level of a wavelength division multiplexed optical signal in a wavelength division multiplexing transmission system. The present invention is characterized by preventing the generation of incorrect wavelength number information due to the erroneous recognition of a signal caused by an abnormal optical signal level so that wavelength number information indicating the number of wavelengths different from that of a multiplexed optical signal is not to be transmitted.

Figure 4:
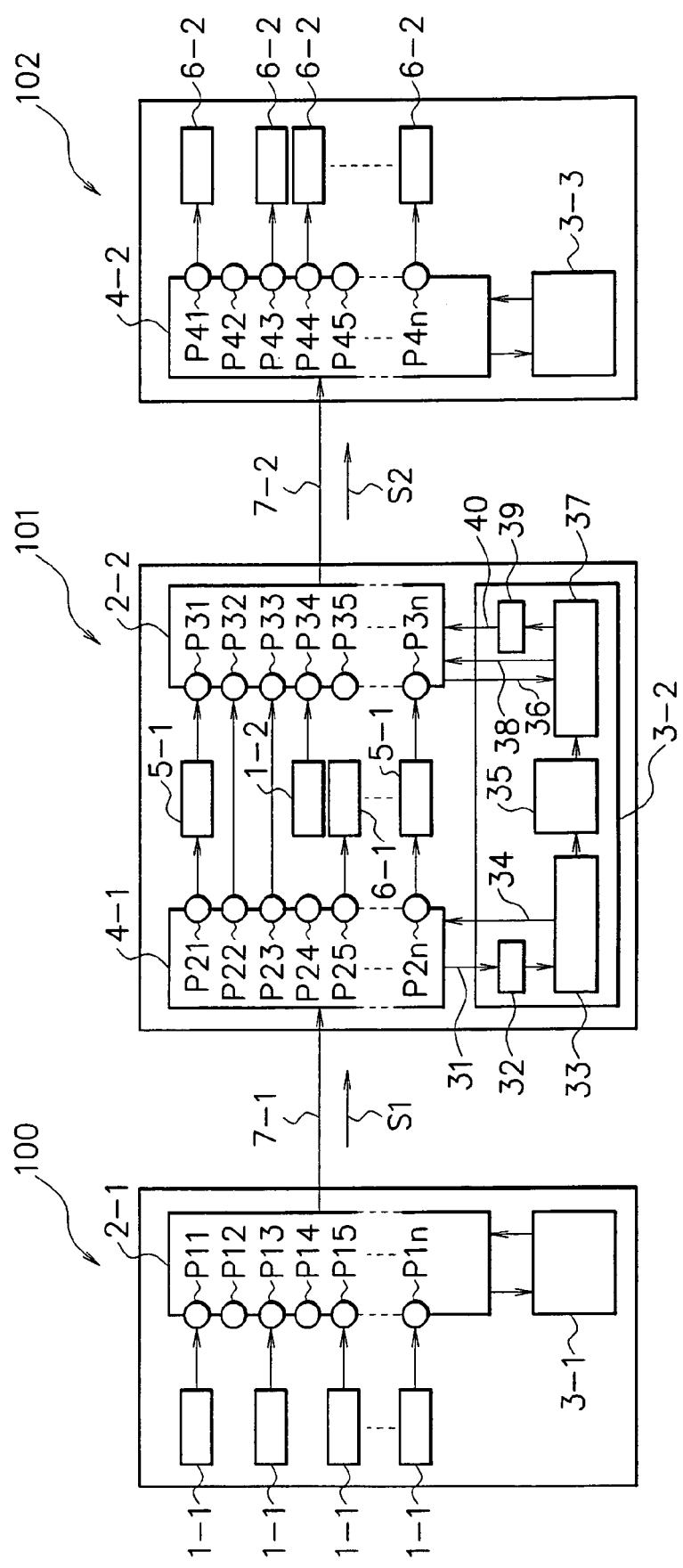
FIG. 4 is a schematic diagram showing a wavelength division multiplexed optical signal transmission system to which is applied a wavelength division multiplexed optical signal transmission method according to an embodiment of the present invention.

FIG. 4 is a schematic diagram showing a wavelength division multiplexed optical signal transmission system to which is applied a wavelength division multiplexed optical signal transmission method according to an embodiment of the present invention.

Referring to FIG. 4, the WDM (wavelength division multiplexed) optical signal transmission system comprises a wavelength multiplexer 100 as an upstream device, an optical repeater 101, and a wavelength demultiplexer 102 as a downstream device.

The wavelength multiplexer 100 includes external interface signal receiving sections 1-1 for receiving controlled optical signals of n wavelengths $\lambda 1$ to $\lambda n$, a wavelength multiplexing section 2-1 for multiplexing (wavelength multiplexing) optical signals input from the respective external interface signal receiving sections 1-1, and a wavelength number information managing section 3-1 for managing optical signals for the wavelength multiplexing section 2-1.

The wavelength number information managing section 3-1 monitors the presence or absence of a controlled optical signal received in each of input sections (ports) P11 to P1n of the wavelength multiplexing section 2-1. The wavelength number information managing section 3-1 adds wavelength number information indicating the presence or absence of controlled optical signals (wavelength: $\lambda 1$ to $\lambda n$) in the respective ports individually to a control optical signal (wavelength number information signal). Subsequently, the wavelength multiplexing section 2-1 multiplexes all controlled optical signals and the control optical signal to output a WDM optical signal S1 to one end (left end in the drawing) of an optical fiber or cable 7-1. That is, the WDM optical signal S1 is composed of controlled optical signals of n wavelengths $\lambda 1$ to $\lambda n$ and a wavelength number information signal of wavelength $\lambda n+1$. Incidentally, the wavelength $\lambda n+1$ is cited merely by way of example and without limitation. The wavelength number information signal may have any wavelength other than those (wavelengths $\lambda 1$ to $\lambda n$) of the controlled optical signals. From the external interface signal receiving sections 1-1 of the wavelength multiplexer 100, the controlled optical signals are input to the ports P11 to P1n, respectively, while the control optical signal is input to the port P1n+1.

The optical repeater 101 includes a wavelength multiplexing section 2-2, a wavelength number information managing section 3-2, a wavelength demultiplexing section 4-1, wavelength repeating sections 5-1 and an external interface signal transmitting section 6-1. The input side of the wavelength demultiplexing section 4-1 is connected to the other end (right end in the drawing) of the optical fiber 7-1. The wavelength number information managing section 3-2 performs necessary processing for controlled optical signals according to wavelength number information about the presence or absence of the respective controlled optical signals in the output sections (ports P21 to P2n) of the wavelength demultiplexing section 4-1 and the necessity of compensating the signals. After the processing, the wavelength number information managing section 3-2 sends the controlled optical signals to the input sections (ports P31 to P3n) of the wavelength multiplexing section 2-2 as a multiplexer. Having received the optical signals, which have undergone the processing, through the input sections (ports P31 to P3n), the wavelength multiplexing section 2-2 performs necessary processing based on the wavelength number information from the wavelength number information managing section 3-2, and multiplexes the control optical signal and controlled optical signals which have undergone the processing to output a WDM optical signal S2 to one end (left end in the drawing) of an optical fiber 7-2.

In FIG. 4, the wavelength repeating section 5-1 is placed between the ports P21 and P31, the ports P22 and P23 are directly connected to the ports P32 and P33, respectively, the output side of an external interface signal receiving section 1-2 as a receiver is connected to the port P34, the output side of the port P25 is connected to the input side of the external interface signal transmitting section 6-1 as a transmitter, and the port P2n is directly connected to the port P3n. However, these connections are not so limited but vary according to the use conditions or quality of controlled optical signals of a WDM optical signal.

The wavelength number information managing section 3-2 includes a wavelength number information signal receiving section 32, a receiving side wavelength number information extracting section 33, an external setting judging section 35, a transmitting side wavelength number information generating section 37, and a wavelength number information signal generating section 39 generating a wavelength number information signal 40.

The wavelength number information managing section 3-1 of the wavelength multiplexer 100 and that (section 3-3) of the wavelength demultiplexer 102 have the same construction as described above for the section 3-2.

The wavelength multiplexer 100, optical repeater 101 and wavelength demultiplexer 102 perform the process 1 through 9 (the wavelength multiplexer 100 performs the process 6 through 8, the optical repeater 101 performs the process 1 through 9, and the wavelength demultiplexer 102 performs the processes 1 through 3) as follows:

1. the wavelength demultiplexing section separates out a wavelength number information signal 31 received from the upstream device to send it as an optical signal to the wavelength number information signal receiving section 32 of the wavelength number information managing section 2. the wavelength number information signal receiving section 32 converts the optical signal received from the wavelength demultiplexing section into an electrical signal to send it to the receiving side wavelength number information extracting section 33

3. the receiving side wavelength number information extracting section 33 extracts wavelength number information from the wavelength number information signal to inform the wavelength demultiplexing section of the total number of wavelengths (receiving side total wavelength number information 34)

4. the receiving side wavelength number information extracting section 33 sends information on the presence or absence of optical signals of respective wavelengths $\lambda 1$ to $\lambda n$ to the external setting judging section 35

5. the external setting judging section 35 determines whether or not to update the information on the presence or absence of optical signals of respective wavelengths $\lambda 1$ to $\lambda n$ based on external settings ("terminate"/ "pass") corresponding to the respective wavelengths $\lambda 1$ to $\lambda n$, and informs the transmitting side wavelength number information generating section 37 of the results 6. the transmitting side wavelength number information generating section 37 receives information on the presence or absence of optical signals of respective wavelengths $\lambda 1$ to $\lambda n$ (signal present/absent information 36) form the wavelength multiplexing section 7. in the wavelength multiplexer 100, the transmitting side wavelength number information generating section 37 generates transmitting side wavelength number information based on the information obtained in the process 6, while in the optical repeater 101, the section 37 generates it based on the information obtained in the processes 5 and 6

8. the transmitting side wavelength number information generating section 37 informs the wavelength multiplexing section of the total number of wavelengths (transmitting side total wavelength number information 38) according to the transmitting side wavelength number information which the section 37 has generated 9. the wavelength number information signal generating section 39 receives the transmitting side wavelength number information generated by the transmitting side wavelength number information generating section 37, and converts the electrical signal into an optical signal having an arbitrary wavelength to send it to the wavelength multiplexing section so that the signal is multiplexed together with optical signals of other wavelengths In the following, a description will be given of the external settings used by the external setting judging section 35. The "external setting" is provided to the wavelength multiplexing sections 2-1 and 2-2 by an external maintainer (not shown) at the time of line setting to indicate the condition of a controlled optical signal in each of input sections or ports. That is, the external setting indicates that each controlled optical signal corresponds to one of signals A to C as follows:

A. a signal from one of the external interface signal receiving sections 1-1 (including a signal to which a wavelength has not yet been assigned)

B. a controlled optical signal which has passed through the wavelength repeating section 5-1

C. a controlled optical signal which is input from the wavelength demultiplexing section 4-1 to the wavelength multiplexing section 2-2, not via the wavelength repeating section 5-1

With regard to the signals A and B, since a controlled optical signal is regenerated in each block, optical noise can be eliminated. On the other hand, in the case of the signal C, a signal is not regenerated after wavelength demultiplexing, and therefore, it is necessary to take optical noise into consideration. Accordingly, there exist two types of settings: "termination" corresponding to the signals A and B and "pass" corresponding to the signal C. For example, in a system capable of multiplexing controlled optical signals of up to 16 wavelengths, there are a total of 16 settings, one for each wavelength.

The wavelength demultiplexer 102 as a downstream device controls such functions as adjustment and monitoring of the level of a WDM optical signal input thereto based on wavelength number information added to a wavelength number information signal separated out in the wavelength demultiplexing section 4-2.

As just described, in accordance with the present invention, wavelength number information used in a WDM optical signal transmission system includes not only the total number of wavelengths but also the presence or absence of an optical signal with respect to each wavelength. In the optical repeater 101, it is determined for each wavelength to directly use wavelength number information transmitted from the wavelength multiplexer 100, or to newly use information as to whether a controlled optical signal has been input to the wavelength multiplexing section 2-2. Thereby, the optical repeater 101 is prevented from erroneously determining that a signal is "present" due to an abnormal signal level caused by optical noise. Thus, the optical repeater 101 informs the wavelength demultiplexer 102 of the correct number of wavelengths, which enables such functions as adjustment and monitoring of the level of a WDM optical signal to be performed properly.

First Embodiment

FIG. 4 shows a wavelength division multiplexed optical signal transmission system to which is applied a wavelength division multiplexed optical signal transmission method according to the first embodiment of the present invention.

As can be seen in FIG. 4, the WDM (wavelength division multiplexed) optical signal transmission system comprises a wavelength multiplexer 100, an optical repeater 101, and a wavelength demultiplexer 102. In the WDM optical signal transmission system, WDM optical signals S1 and S2, each obtained by multiplexing controlled optical signals of up to n wavelengths (wavelength: $\lambda 1$ to $\lambda n$) and one control optical signal (wavelength: $\lambda n+1$), are transmitted along the route from the wavelength multiplexer 100 to the wavelength demultiplexer 102.

There may be disposed a plurality of the optical repeaters 101 depending on the length or distance of a transmission line (optical fibers 7-1 and 7-2) or the attenuation in the level of a received optical signal. The optical repeater 101 is capable of diverting an arbitrary optical signal to an external interface signal transmitting section 6-1 as well as wavelength multiplexing optical signals newly received through an external interface signal receiving section 1-2.

In FIG. 4 illustrating the wavelength multiplexer 100, optical repeater 101, and wavelength demultiplexer 102, the reference numerals 1-1 and 1-2 represent external interface signal receiving sections. Each of the external interface signal receiving sections receives an optical signal from an opposite device (not shown) and converts it to a controlled optical signal having an arbitrary wavelength.

The reference numeral 2-1 represents a wavelength multiplexing section. Having received a control optical signal and controlled optical signals of n different wavelengths obtained in the external interface signal receiving sections 1-1, the wavelength multiplexing section 2-1 generates a WDM optical signal S1 and adjust the optical signal level according to the number of the wavelengths to send it to the transmission line (optical fiber 7-1).

The reference numeral 2-2 also represents a wavelength multiplexing section. However, differently from the wavelength multiplexing section 2-1, the wavelength multiplexing section 2-2 receives controlled optical signals after compensation or regeneration as well as normal controlled optical signals from a wavelength demultiplexing section 4-1. Further, the wavelength multiplexing section 2-2 receives a controlled optical signal obtained in the external interface signal receiving section 1-2. The wavelength multiplexing section 2-2 generates a WDM optical signal S2 with the controlled optical signals and a wavelength number information signal from a wavelength number information managing section 3-2 to send it to the transmission line (optical fiber 7-2).

The reference numerals 3-1, 3-2 and 3-3 represent wavelength number information managing sections for managing the number of wavelengths of the controlled optical signals multiplexed into the WDM optical signal S1 or S2.

The reference numeral 4-1 represents a wavelength demultiplexing section. Having received the WDM optical signal S1 from the transmission line (optical fiber 7-1), the wavelength demultiplexing section 4-1 adjusts the optical level of the signal S1 according to the number of wavelengths and demultiplexes the signal S1 into optical signals of wavelengths $\lambda 1$ to $\lambda n+1$. The wavelength demultiplexing section 4-1 outputs the controlled optical signals (wavelength: $\lambda 1$ to $\lambda n$) to corresponding ports P21 to P2n, respectively, and the control optical signal (wavelength: $\lambda n+1$) to the wavelength number information managing section 3-2.

The reference numeral 4-2 also represents a wavelength demultiplexing section. Having received the WDM optical signal S2 from the transmission line (optical fiber 7-2), the wavelength demultiplexing section 4-2 adjusts the optical level of the signal S2 according to the number of wavelengths and demultiplexes the signal S2 into optical signals of wavelengths $\lambda 1$ to $\lambda n+1$. The wavelength demultiplexing section 4-2 outputs the controlled optical signals (wavelength: $\lambda 1$ to $\lambda n$) to corresponding ports P41 to P4n, respectively, and the control optical signal (wavelength: $\lambda n+1$) to the wavelength number information managing section 3-3.

The reference numeral 5-1 represents wavelength repeating sections for compensating a deteriorated controlled optical signal to restore it to its original quality.

The reference numeral 6-1 represents an external interface signal transmitting section. The external interface signal transmitting section 6-1 transmits a controlled optical signal to an opposite device (not shown).

In the wavelength multiplexer 100 shown in FIG. 4, each of optical signals received by the external interface signal receiving sections 1-1 is converted to an optical signal of an arbitrary wavelength for generating a WDM optical signal, and sent to the wavelength multiplexing section 2-1.

The wavelength multiplexing section 2-1 wavelength multiplexes controlled optical signals of up to n wavelengths and one control optical signal to generate the WDM optical signal S1. On this occasion, the input levels of the respective optical signals are monitored at input sections (ports P11 to P1n) of the wavelength multiplexing section 2-1. When the input level is not less than a preset reference value, it is determined that the controlled optical signal is "present". On the other hand, when the input level is less than the reference value, it is determined that the controlled optical signal is "absent". The information is fed to the wavelength number information managing section 3-1.

The wavelength number information managing section 3-1 generates a wavelength number information signal (control optical signal) based on the wavelength number information received from the wavelength multiplexing section 2-1, and sends it to the section 2-1.

The wavelength multiplexing section 2-1 multiplexes controlled optical signals of n wavelengths and the wavelength number information signal (control optical signal) to generate the WDM optical signal S1 to send it to the transmission line (optical fiber 7-1). On this occasion, the wavelength number information managing section 3-1 adjusts the output level of the transmitted optical signal as well as the monitoring level of the signal level monitoring function according to the number of wavelengths indicated by the wavelength number information signal.

In the optical repeater 101, the wavelength demultiplexing section 4-1 separates the wavelength number information signal (control optical signal) from the received WDM optical signal to send it to the wavelength number information managing section 3-2.

The wavelength number information managing section 3-2 feeds the wavelength demultiplexing section 4-1 with information on the total number of wavelengths obtained from the received control optical signal.

When the wavelength demultiplexing section 4-1 demultiplexes the received WDM optical signal S1, the control optical signal that contains the wavelength number information is also subjected to the wavelength demultiplexing. At this point, the wavelength demultiplexing section 4-1 has not acquired the contents of the control optical signal: the wavelength number information. The wavelength number information managing section 3-2 interprets the contents of the optical signal. The wavelength demultiplexing section 4-1 needs the wavelength number information concerning the received WDM optical signal S1 to compensate the level of the optical signal. As the wavelength number information, the wavelength demultiplexing section 4-1 does not use wavelength number information generated in the wavelength number information managing section 3-2 of its own device but uses information generated in the upstream device. Accordingly, the wavelength number information managing section 3-2 is required to inform the wavelength demultiplexing section 4-1 of the number of wavelengths of the optical signal. The wavelength demultiplexing section 4-1 adjusts the level of the received optical signal as well as the monitoring level of the signal level monitoring function based on the wavelength number information indicated by the control optical signal.

In the wavelength demultiplexing section 4-1, it is determined according to settings provided by an external maintainer whether each of optical signals (wavelength: $\lambda1$ to $\lambda n$) obtained by wavelength demultiplexing is to be transmitted from the external interface signal transmitting section 6-1 to the opposite device (not shown) or it is to be sent to the wavelength multiplexing section 2-2 and remultiplexed into the WDM optical signal S2.

Line setting regarding from where to where the optical signal is transmitted determines whether each of demultiplexed optical signals is to be sent to the external interface signal transmitting section 6-1 or the wavelength multiplexing section 2-2.

It is assumed, for example, that the wavelength multiplexer 100 is placed in the area A, the optical repeater 101 is placed in the area B, and the wavelength demultiplexer 102 is placed in the area C. In the case of setting a line along the route from the area A to the area B, an optical signal is sent to the external interface signal transmitting section 6-1 to be dropped. In the case of setting a line along the route from the area A to the area C, an optical signal is sent to the wavelength multiplexing section 2-2. Further, in the case of setting a line along the route from the area B to the area C, an optical signal is newly sent from the external interface signal receiving section 1-2 to the wavelength multiplexing section 2-2 to be added.

The "line setting" may be simply provided by the patch connection of optical fiber cables connecting respective blocks, or provided by the use of an optical switch automatically controlled to establish a connection. It is not necessary for the present invention to specify the method of implementing the line setting.

Besides, when a signal is remultiplexed into a WDM optical signal, there is the case where compensation is performed for signal deterioration in the wavelength repeating section 5-1 depending on transmission distance.

A determination as to whether or not to use the wavelength repeating section 5-1 is made based on the transmission distance and the number of spans between the wavelength multiplexer 100 and the optical repeater 101 as well as those between the repeater 101 and the wavelength demultiplexer 102. As the transmission distance or the number of spans increases, a transmitted optical signal deteriorates significantly. Therefore, it is required to regenerate (repeat) the optical signal through the use of the wavelength repeating section 5-1. The transmission distance that needs signal repeating is uniquely determined by the distance and the number of spans in which the wavelength multiplexer 100, optical repeater 101 and the wavelength demultiplexer 102 can assure the quality of a signal without repeating the signal.

In the optical repeater 101, the input levels of controlled optical signals are also monitored at input sections (ports P31 to P3n) of the wavelength multiplexing section 2-2 to determine whether controlled optical signals of respective wavelengths $\lambda1$ to $\lambda n$ are "present" or "absent". The wavelength multiplexing section 2-2 feeds the wavelength number information managing section 3-2 with the results.

The wavelength number information managing section 3-2 generates a wavelength number information signal based on the information received from the wavelength multiplexing section 2-2 to send it to the section 2-2.

The wavelength multiplexing section 2-2 multiplexes the wavelength number information signal together with controlled optical signals of n wavelengths to generate a WDM optical signal to send it to the transmission line (optical fiber 7-2). On this occasion, the output level of the transmitted optical signal and the monitoring level of the signal level monitoring function are adjusted according to the number of wavelengths indicated by the wavelength number information signal.

In the wavelength demultiplexer 102, the wavelength demultiplexing section 4-2 separates the wavelength number information signal from the received WDM optical signal to send it to the wavelength number information managing section 3-3.

The wavelength number information managing section 3-3 feeds the wavelength demultiplexing section 4-2 with information on the number of wavelengths obtained from the received control optical signal.

Based on the information on the number of wavelengths received from the wavelength number information managing section 3-3, the wavelength demultiplexing section 4-2 adjusts the level of the received optical signal and the monitoring level of the signal level monitoring function.

The wavelength demultiplexing section 4-2 demultiplexes the WDM optical signal into controlled optical signals of respective wavelengths $\lambda1$ to $\lambda n$ to transmit them from external interface signal transmitting sections 6-2 to opposite devices (not shown).

In the following, a description will be made in detail of the operation of the wavelength multiplexer 100 in the WDM optical signal transmission system of the first embodiment shown in FIG. 4.

The wavelength multiplexing section 2-1 monitors the input levels of respective optical signals at the input sections (ports P11 to P1n) to determine whether optical signals of respective wavelengths are "present" or "absent".

In FIG. 4, the optical signal of the first wavelength (port P11) is "present", the optical signal of the second wavelength (port P12) is "absent", the optical signal of the third wavelength (port P13) is "present", the optical signal of the fourth wavelength (port P14) is "absent", the optical signal of the fifth wavelength (port P15) is "present", . . . , and the optical signal of the n-th wavelength (port P1n) is "present".

The information obtained at the respective input sections (ports P11 to P1n) is fed to the wavelength number information managing section 3-1.

The wavelength number information managing section 3-1 generates a wavelength number information signal based on the information received from the wavelength multiplexing section 2-1.

FIG. 5 is a diagram showing a wavelength number information signal transmitted in the WDM optical signal transmission system shown in FIG. 4.

Referring to FIG. 5, data D21 indicates the presence or absence of the controlled optical signal of the first wavelength, data D22 indicates the presence or absence of the controlled optical signal of the second wavelength, . . . , data D2n indicates the presence or absence of the controlled optical signal of the n-th wavelength, and data D2T indicates the total number of wavelengths. The data D21 to D2T provide wavelength number information added to a control optical signal.

A wavelength number information signal has a wavelength different from those of optical signals generated in the external interface signal receiving sections 1-1. The total number of wavelengths is obtained from information as to the presence or absence of optical signal input at the respective input sections (ports P11 to P1n) of the wavelength multiplexing section 2-1 and count of the signals present. The total number of wavelengths is stored in the "total wavelength number" area (time slot).

Incidentally, according to the present invention, wavelength number information does not necessarily include the "total wavelength number". Wavelength number information may include information on the "presence" or "absence" of optical signals of respective wavelengths only. In such a case, the total number of wavelengths can be figured out in the respective devices by counting optical signals being "present".

The wavelength multiplexing section 2-1 wavelength multiplexes a wavelength number information signal and controlled optical signals of up to n wavelengths to generate a WDM optical signal, and sends it to the transmission line (optical fiber 7-1).

In the following, a description will be made in detail of the operation of the optical repeater 101.

The wavelength demultiplexing section 4-1 separates a wavelength number information signal from a received WDM optical signal to send it to the wavelength number information managing section 3-2.

The wavelength number information managing section 3-2 feeds the wavelength demultiplexing section 4-1 with information on the total number of wavelengths obtained from the received optical signal.

The wavelength demultiplexing section 4-1 adjusts the level of optical signals that have deteriorated during transmission as well as the monitoring level of the signal level monitoring function based on the information as to the total number of wavelengths.

Figure 6:
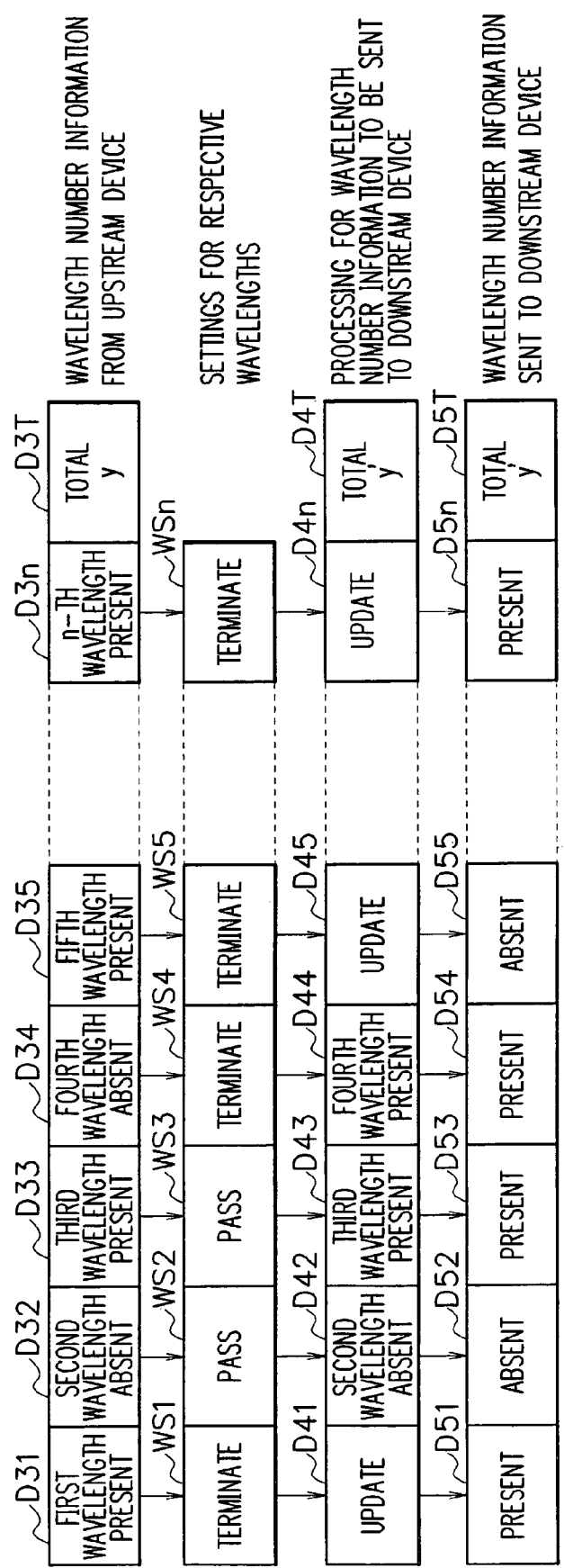
FIG. 6 is a diagram showing a method of updating wavelength number information in an optical repeater depicted in FIG. 4.

FIG. 6 is a diagram showing the process of updating wavelength number information in the optical repeater 101.

According to settings provided by an external maintainer, a determination is made as to whether each of controlled optical signals (wavelength: λ1 to λn) obtained by demultiplexing in the wavelength demultiplexing section 4-1 is to be transmitted from the external interface signal transmitting section 6-1 to the opposite device (not shown) or it is to be sent to the wavelength multiplexing section 2-2 and remultiplexed into the WDM optical signal S2.

When an optical signal is transmitted from the external interface signal transmitting section 6-1 or the wavelength repeating section 5-1 is utilized, the setting provided by an external maintainer indicates "terminate". On the other hand, when an optical signal is directly sent to the wavelength multiplexing section 2-2, the setting indicates "pass". In the case where the setting for a wavelength indicates "terminate", information from the wavelength multiplexing section 2-2 becomes effective, and wavelength number information is updated with respect to the wavelength. On the other hand, in the case where the setting for a wavelength indicates "pass", wavelength number information received from the wavelength demultiplexing section 4-1 is directly sent to the wavelength multiplexing section 2-2. However, if wavelength number information sent from the wavelength multiplexing section 2-2 indicates the "absence" of an optical signal despite the fact that wavelength number information from the upstream device indicates the "presence" of the signal, there may be a fault in the route. Therefore, information from the wavelength multiplexing section 2-2 is applied.

Conditions for determining the presence or absence of controlled optical signals are shown in table 1 below.

TABLE 1

| Setting | Presence/Absence of Signal Determined from Input Level | Presence/Absence of Signal Indicated by Information from Upstream Device | Determination Result as to Presence/Absence of Signal with Specific Wavelength |
|---|---|---|---|
| Terminate | Present | Ignored | Present |
|  | Absent |  | Absent |
| Pass | Present | Present | Present |
|  |  | Absent | Absent (Noise) |
|  | Absent | Ignored | Absent |

A concrete example will be given for purposes of illustration.

The first (top) row shown in FIG. 6 represents wavelength number information from the upstream device (wavelength multiplexer 100). The wavelength number information includes data D31 indicating the presence of a controlled optical signal having the first wavelength (λ1), data D32 indicating the absence of a signal having the second wavelength (λ2), data D33 indicating the presence of a signal having the third wavelength (λ3), data D34 indicating the absence of a signal having the fourth wavelength (λ4), . . . , data D3n indicating the presence of a signal having the n-th wavelength (λn), and data D3T indicating the total number "y" of data each indicating the presence of a controlled optical signal.

In the wavelength number information managing section 3-2, it is determined whether or not to update the wavelength number information shown in the first row based on prescribed settings with respect to each of the wavelengths λ1 to λn. The data D31 corresponds to setting WS1 indicating "terminate", the data D32 corresponds to setting WS2 indicating "pass", the data D33 corresponds to setting WS3 indicating "pass", . . . , and the data D3n corresponds to setting WSn indicating "terminate".

The third row shown in FIG. 6 represents processing for the wavelength number information to transmit it to the downstream device (wavelength demultiplexer 102). The setting WS1 corresponds to data D41 indicating "update", the setting WS2 corresponds to data D42 indicating the absence of the controlled optical signal of the second wavelength, the setting WS3 corresponds to data D43 indicating the presence of the signal of the third wavelength, . . . , and the setting WSn corresponds to data D4n indicating "update". Data D4T indicates the total number "y" of data each indicating "update" or "presence" out of the data D41 to D4n.

The fourth (bottom) row shown in FIG. 6 represents final wavelength number information which has undergone the processing shown in the third row to be transmitted to the downstream device (wavelength demultiplexer 102). That is, to the downstream device is transmitted wavelength number information including data D51 indicating the presence of the controlled optical signal of the wavelength λ1, data D52 indicating the absence of the signal of the wavelength λ2, data D53 indicating the presence of the signal of the wavelength λ3, . . . , data D5n indicating the presence of the signal of the wavelength λn, and data D5T indicating the total number "y" of data each indicating the presence of a controlled optical signal out of the data D51 to D5n.

In the following, a description will be made in detail of the operation of the wavelength demultiplexer 102.

In the wavelength demultiplexer 102, the wavelength demultiplexing section 4-2 separates a wavelength number information signal from the received WDM optical signal S2 to send it to the wavelength number information managing section 3-3.

The wavelength number information managing section 3-3 feeds the wavelength demultiplexing section 4-2 with information on the total number of wavelengths obtained from the received optical signal.

The aforementioned operation of the respective devices will be described with reference to flowcharts.

Figure 7:
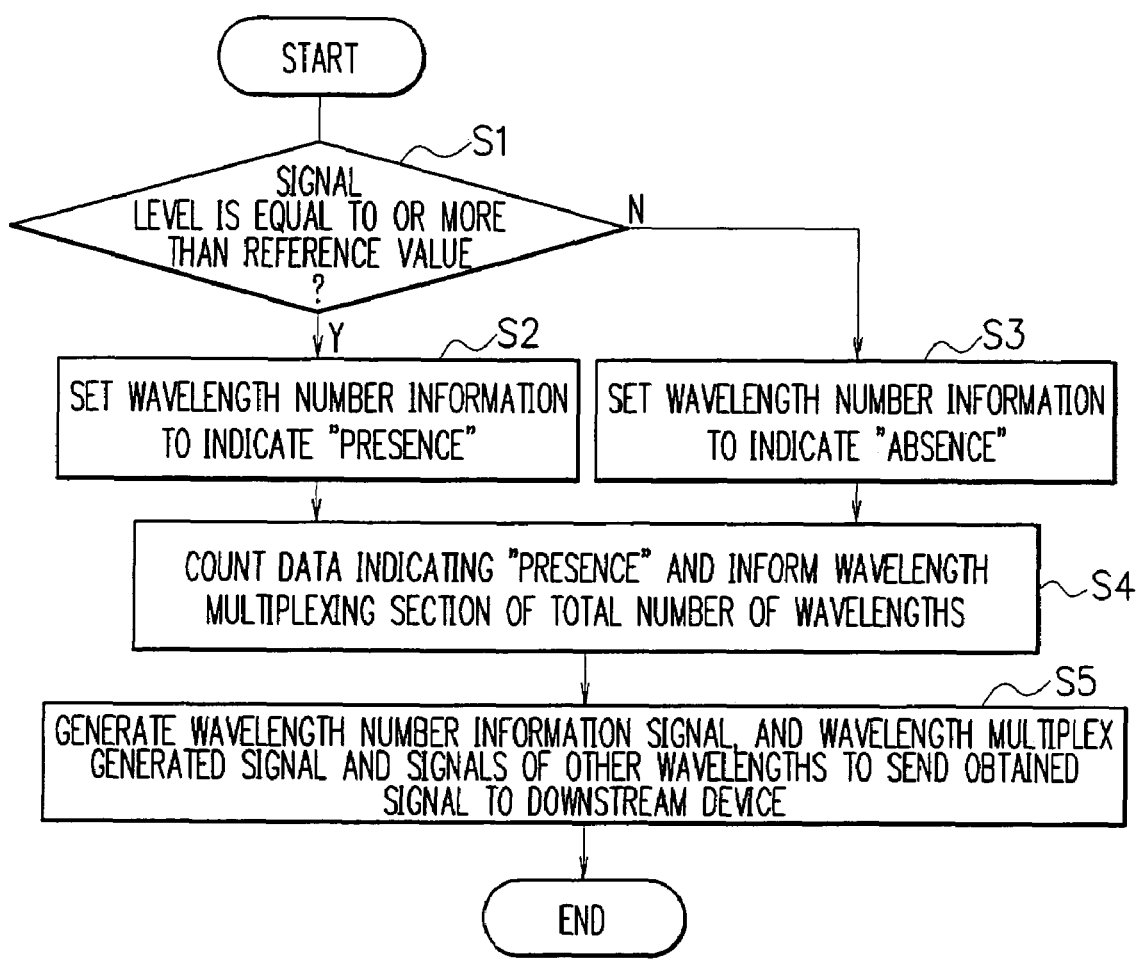
FIG. 7 is a flowchart showing the operation of a wavelength multiplexer depicted in FIG. 4 for processing a wavelength number information signal.
Figure 8:
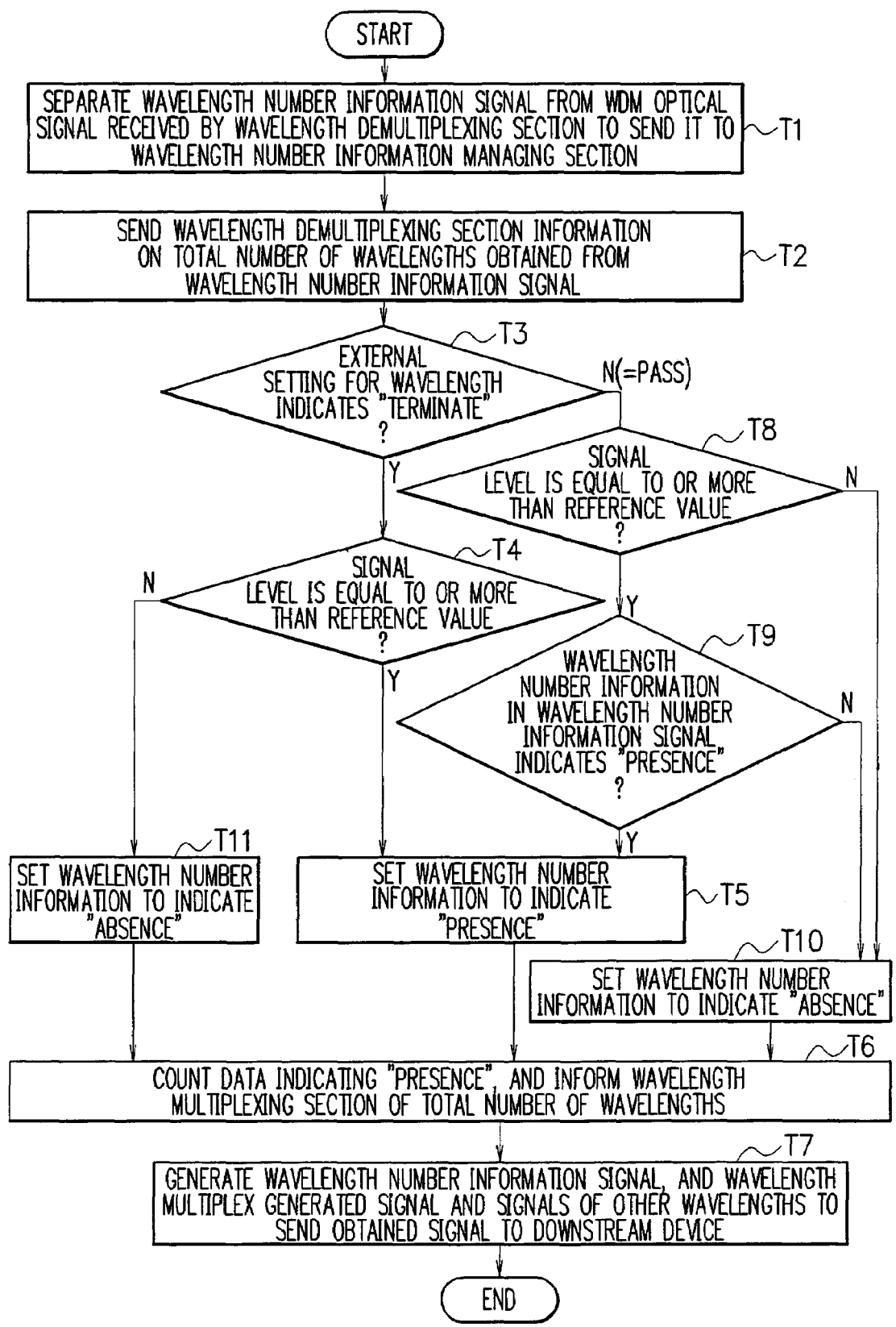
FIG. 8 is a flowchart showing the operation of the optical repeater depicted in FIG. 4 for processing a wavelength number information signal.
Figure 9:
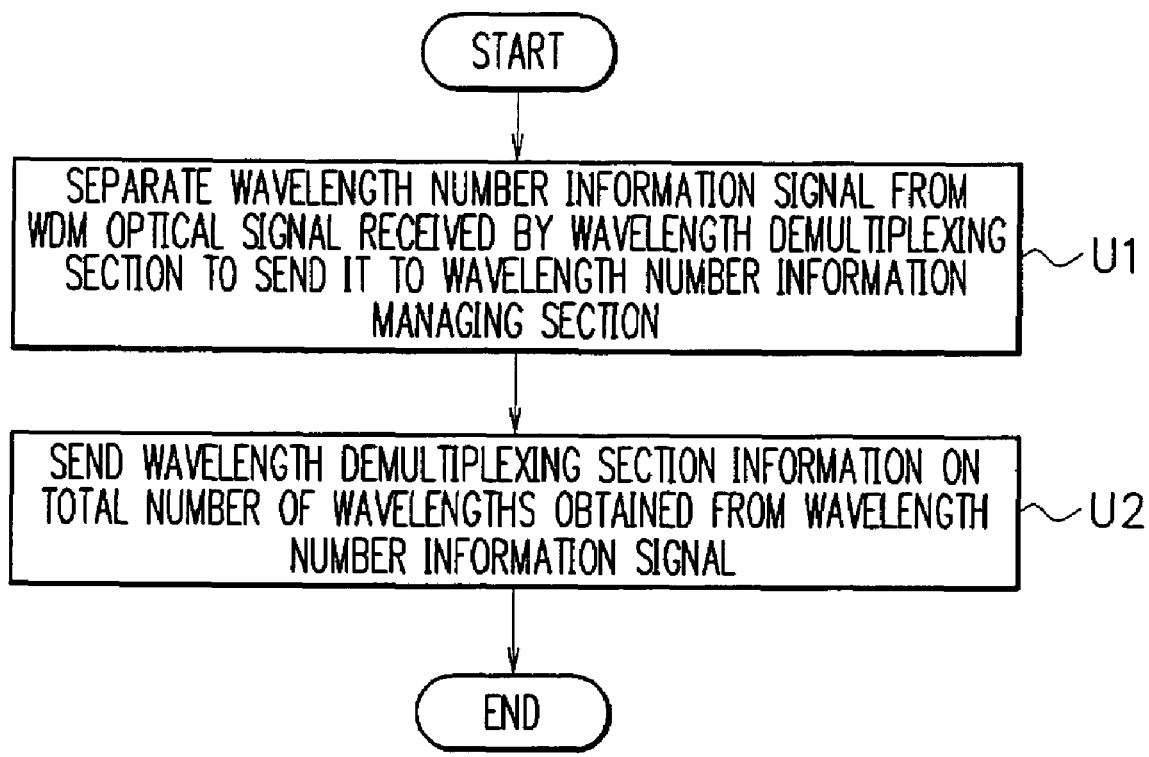
FIG. 9 is a flowchart showing the operation of a wavelength demultiplexer depicted in FIG. 4 for processing a wavelength number information signal.

FIG. 7 is a flowchart showing the operation of the wavelength multiplexer 100 depicted in FIG. 4 for processing a wavelength number information signal. FIG. 8 is a flowchart showing the operation of the optical repeater 101 depicted in FIG. 4 for processing the wavelength number information signal. FIG. 9 is a flowchart showing the operation of the wavelength demultiplexer 102 depicted in FIG. 4 for processing the wavelength number information signal.

Referring to FIG. 7, the wavelength multiplexer 100 (see FIG. 4) determines whether or not the optical signal level is equal to or more than a reference value at the input section (ports P11 to P1n) of the wavelength multiplexing section 2-1 (step S1).

When having determined that the optical signal level is not less than the reference value (step S1/Y), the wavelength multiplexer 100 sets wavelength number information to indicate the "presence" of the optical signal of the relevant wavelength (step S2). On the other hand, when having determined that the optical signal level is less than the reference value (step S1/N), the wavelength multiplexer 100 sets the wavelength number information to indicate the "absence" of the optical signal of the relevant wavelength (step S3).

The wavelength number information managing section 3-1 counts data indicating the "presence" of an optical signal, thereby informing the wavelength multiplexing section 2-1 of the total number of wavelengths (step S4).

The wavelength multiplexing section 2-1 multiplexes a wavelength number information signal generated in the wavelength number information managing section 3-1 together with optical signals of other wavelengths, and transmits a WDM optical signal to the downstream device: the optical repeater 101 (step S5).

Referring to FIG. 8, the optical repeater 101 (see FIG. 4) separates the wavelength number information signal from the received WDM optical signal in the wavelength demultiplexing section 4-1 to send it to the wavelength number information managing section 3-2 (step T1).

The wavelength number information managing section 3-2 feeds the wavelength demultiplexing section 4-1 with information on the total number of wavelengths obtained from the wavelength number information signal (step T2).

The wavelength number information managing section 3-2 determines whether or not an external setting with respect to each wavelength indicates "terminate" (step T3), this step corresponding to the process 5 described hereinbefore. When having determined that the external setting indicates "terminate" (step T3/Y), the wavelength number information managing section 3-2 determines whether or not the optical signal level at the input section (ports P31 to P3n) of the wavelength multiplexing section 2-2 is equal to or more than a reference value (step T4).

When having determined that the optical signal level is not less than the reference value (step T4/Y), the wavelength number information managing section 3-2 sets wavelength number information to indicate the "presence" of the optical signal of the relevant wavelength (step T5). On the other hand, when having determined that the optical signal level is less than the reference value (step T4/N), the wavelength number information managing section 3-2 sets the wavelength number information to indicate the "absence" of the optical signal of the relevant wavelength (step T11).

After that, the wavelength number information managing section 3-2 counts data each indicating the "presence" of an optical signal, thereby informing the wavelength multiplexing section 2-2 of the total number of wavelengths (step T6).

The wavelength multiplexing section 2-2 multiplexes a wavelength number information signal generated in the wavelength number information managing section 3-2 together with optical signals of other wavelengths, and transmits a WDM optical signal to the downstream device: the wavelength demultiplexer 102 (step T7).

In step T3, when having determined that the external setting for a wavelength does not indicate "terminate" (step T3/N="pass"), the wavelength number information managing section 3-2 also determines whether or not the optical signal level at the input section of the wavelength multiplexing section 2-2 is equal to or more than a reference value (step T8). When having determined that the optical signal level is not less than the reference value (step T8/Y), the wavelength number information managing section 3-2 determines whether or not the wavelength number information contained in the received wavelength number information signal indicates the "presence" of the optical signal of the wavelength (step T9). When having determined that the wavelength number information indicates the "presence" of the optical signal (step T9/Y), the wavelength number information managing section 3-2 sets the wavelength number information to indicate the "presence" of the optical signal of the relevant wavelength (step T5). Thereafter, steps T6 and T7 are performed.

When having determined that the optical signal level is less than the reference value (step T8/N), and that the wavelength number information contained in the received wavelength number information signal does not indicate the "presence" of the optical signal (step T9/N), the wavelength number information managing section 3-2 sets the wavelength number information to indicate the "absence" of the optical signal of the relevant wavelength (step T10). Thereafter, steps T6 and T7 are performed.

Referring to FIG. 9, the wavelength demultiplexer 102 (see FIG. 4) separates the wavelength number information signal from the received WDM optical signal in the wavelength demultiplexing section 4-2 to send it to the wavelength number information managing section 3-3 (step U1).

The wavelength number information managing section 3-3 feeds the wavelength demultiplexing section 4-2 with information on the total number of wavelengths obtained from the wavelength number information signal (step U2).

Incidentally, examples of devices of this kind include an optical repeater (amplifier) that adjusts the level of a WDM optical signal without wavelength-division multiplexing optical signals. Such an optical amplifier repeater has a construction without the wavelength number information managing section, and operates similarly to the optical repeater 101 except not to perform wavelength-division multiplexing on optical signals. The optical amplifier repeater also adjusts the signal level based on wavelength number information. However, since the optical amplifier repeater does not demultiplex a WDM optical signal and wavelength-division multiplexes a wavelength number information signal only, it does not need wavelength number information about individual wavelengths as described above. Although the optical amplifier repeater controls controlled optical signals based on the total number of wavelengths at present, it may control the signals based on the total number of data each indicating the "presence" of a controlled optical signal Generally, repetitive multiplexing and demultiplexing on a WDM optical signal cause optical noise, which tends to increase the optical level of a wavelength at which originally no optical signal is present. However, according to the first embodiment of the present invention, wavelength number information can be precisely transmitted from an upstream device to a downstream device. Therefore, by application of the WDM optical signal transmission method of this embodiment, it is possible to distinguish correctly between optical level caused by optical noise and that of a main signal.

Second Embodiment

Figure 10:
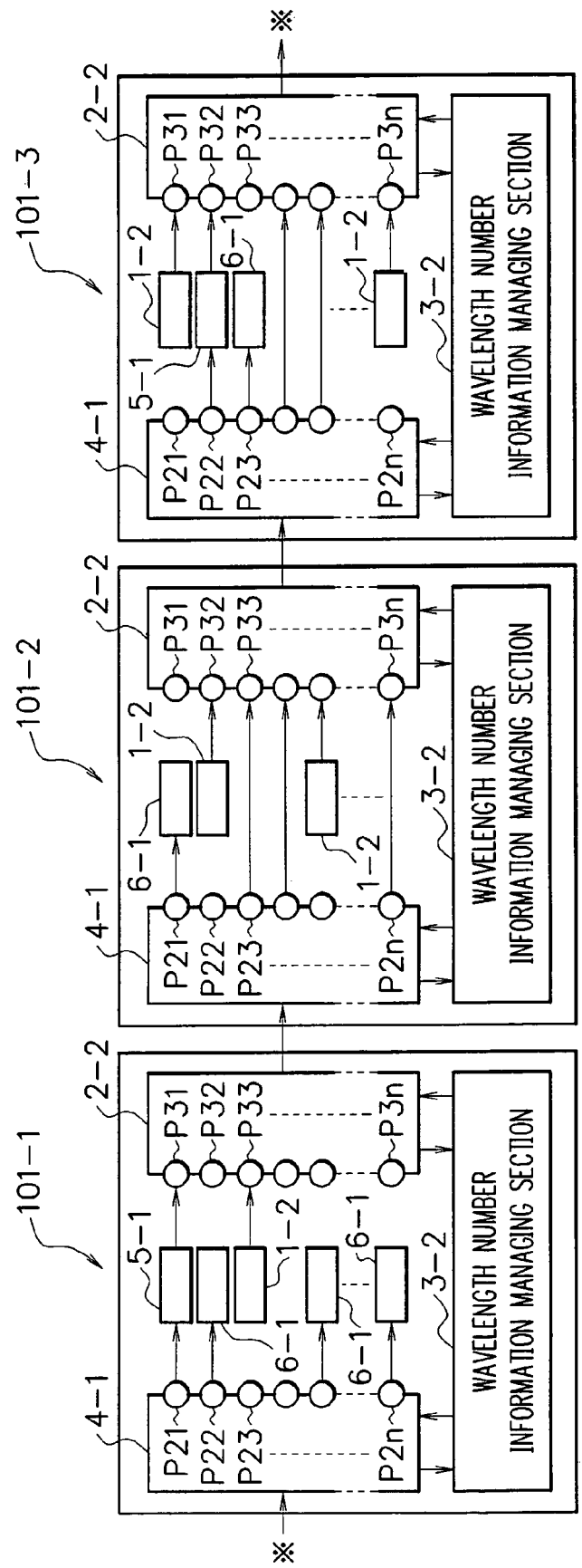
FIG. 10 is a schematic diagram showing a wavelength division multiplexed optical signal transmission system to which is applied a wavelength division multiplexed optical signal transmission method according to another embodiment of the present invention.

FIG. 10 is a schematic diagram showing a wavelength division multiplexed optical signal transmission system to which is applied a wavelength division multiplexed optical signal transmission method according to the second embodiment of the present invention.

As can be seen in FIG. 10, the WDM optical signal transmission system of this embodiment is a ring network system comprising optical repeaters 101-1, 101-2 and 101-3 only.

The ring network has a construction in which devices are arranged to form a circle. In this construction, optical signals are transmitted from one device to another with wavelengths $\lambda 1$ to $\lambda n$. Each device needs to have functions for demultiplexing a WDM optical signal input thereto into optical signals of respective wavelengths $\lambda 1$ to $\lambda n$, determining whether to drop, add or pass through an optical signal with respect to each wavelength, and multiplexing the optical signals into a WDM optical signal to transmit it. The optical repeater 101 can implement the functions.

Besides, a device that terminates wavelength number information is essential for this system to prevent the information from looping. In this device, external settings for all wavelengths indicate "terminate", and the wavelength repeating section 5-1 is necessarily utilized for a passing optical signal.

Incidentally, while the WDM optical signal transmission system of this embodiment comprises three optical repeaters 101-1, 101-2 and 101-3, there is no special limitation on the number of optical repeaters.

In FIG. 10, the optical repeater 101-1 at left is the device that terminates wavelength number information, and the symbols "✖" indicates a connection therebetween. The optical repeater 101-1 at left provides the upstream device as well as the downstream device.

Incidentally, examples of devices of this kind include an optical repeater (amplifier) that adjusts the level of a WDM optical signal without wavelength-division multiplexing optical signals. Such an optical amplifier repeater has a construction without the wavelength number information managing section, and operates similarly to the respective optical repeaters 101-1, 101-2 and 101-3 except not to perform wavelength-division multiplexing on optical signals. The optical amplifier repeater also adjusts the signal level based on wavelength number information. However, since the optical amplifier repeater does not demultiplex a WDM optical signal and wavelength-division multiplexes a wavelength number information signal only, it does not need wavelength number information about individual wavelengths as described above. Although the optical amplifier repeater controls controlled optical signals based on the total number of wavelengths at present, it may control the signals based on the total number of data each indicating the "presence" of a controlled optical signal As is described above, according to the second embodiment of the present invention, the WDM optical signal transmission system may be constructed of optical repeaters and optical fibers. In addition, wavelength number information can be precisely transmitted from an upstream device to a downstream device, and therefore, it is possible to distinguish correctly between optical level caused by optical noise and that of a main signal.

Third Embodiment

Figure 11:
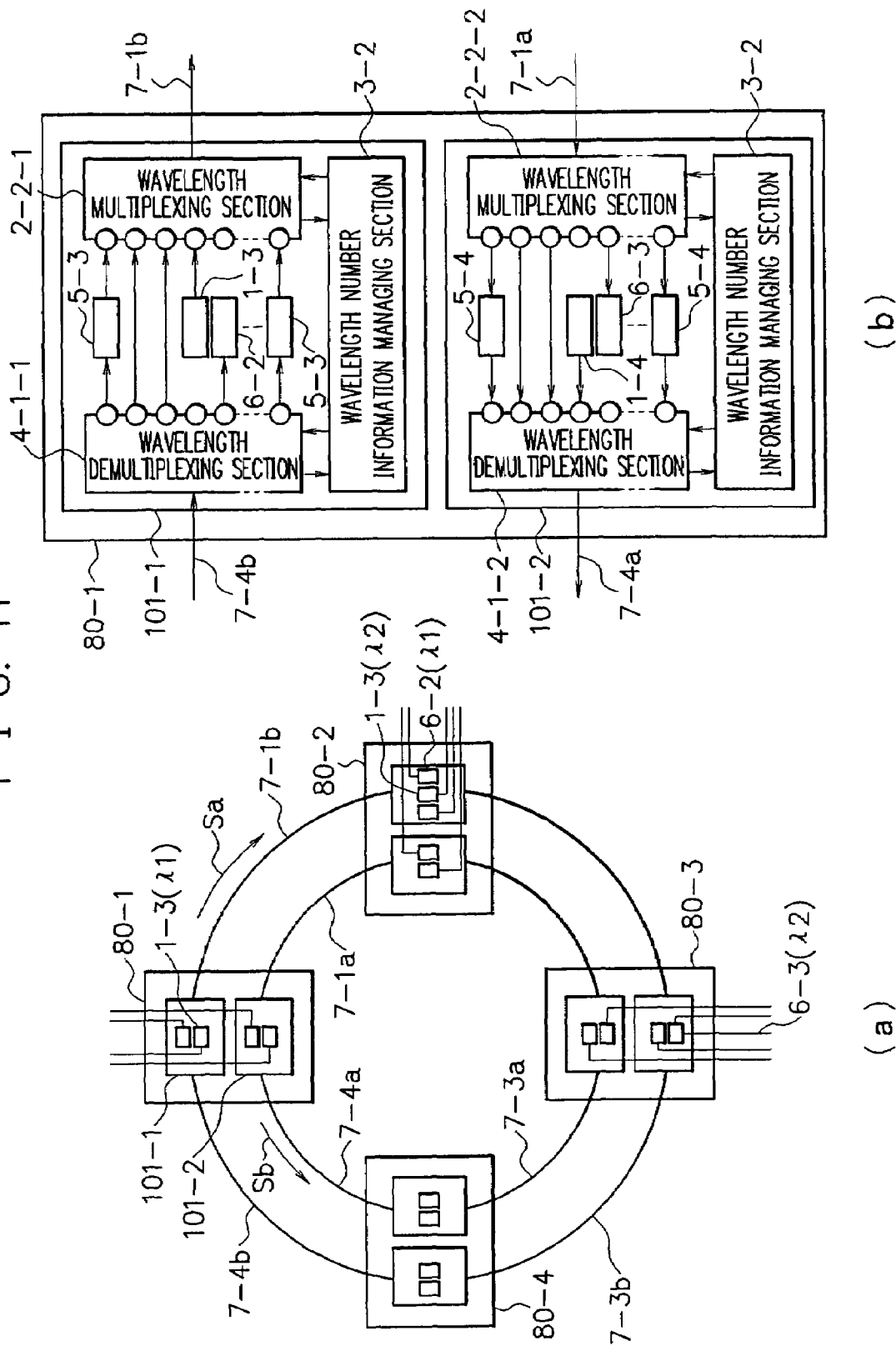
FIG. 11(a) is a schematic diagram showing a wavelength division multiplexed optical signal transmission system to which is applied a wavelength division multiplexed optical signal transmission method according to another embodiment of the present invention.
FIG. 11(b) is a schematic diagram showing an optical repeater depicted in FIG. 11(a)

FIG. 11(a) is a schematic diagram showing a wavelength division multiplexed optical signal transmission system to which is applied a wavelength division multiplexed optical signal transmission method according to the third embodiment of the present invention. FIG. 11(b) is a schematic diagram showing an optical repeater depicted in FIG. 11(a).

As can be seen in FIG. 11(a), the WDM optical signal transmission system of this embodiment comprises a plurality of optical repeaters 80-1 to 80-4 connected via plural pairs of optical fibers 7-1a and 7-1b to 7-4a and 7-4b. While FIG. 11(a) shows four optical repeaters connected via four pairs of optical fibers, there is no special limitation on the number of optical repeaters as well as pairs of optical fibers.

The optical repeater 80-1 includes a pair of optical repeater units 101-1 and 101-2. As shown in FIG. 11(b), both the optical repeater units 101-1 and 101-2 has the same construction as described previously for the optical repeater 101 in connection with FIG. 4. The optical repeater units 101-1 and 101-2 are arranged so as to receive WDM optical signals from opposite directions as well as outputting them to opposite directions.

The other optical repeaters 80-2 to 80-4 are of the same construction as the optical repeater 80-1.

In the WDM optical signal transmission system of this embodiment, for example, a controlled optical signal having a wavelength $\lambda 1$ may be input to the external interface signal receiving section 1-3 of the optical repeater 80-1 and output from the external interface signal transmitting section 6-2 of the optical repeater 80-2. Similarly, a controlled optical signal having a wavelength $\lambda 2$ may be input to the external interface signal receiving section 1-3 of the optical repeater 80-2 and output from the external interface signal transmitting section 6-2 of the optical repeater 80-3. In other words, any controlled optical signal input to the external interface signal receiving section 1-3 of any one of the optical repeaters 80-1 to 80-4 may be output from the external interface signal transmitting section 6-2 of any one of the repeaters 80-1 to 80-4.

As is described above, according to the third embodiment of the present invention, the WDM optical signal transmission system has an independent functional block and performs independent processing with respect to one direction. That is, the combination of the optical repeaters each having a pair of optical repeater units enables the WDM optical signal transmission system to be applicable to a bidirectional communication network.

Fourth Embodiment

FIG. 12 is a schematic diagram showing a wavelength division multiplexed optical signal transmission system to which is applied a wavelength division multiplexed optical signal transmission method according to the fourth embodiment of the present invention.

Referring to FIG. 12, the WDM optical signal transmission system of this embodiment comprises a plurality of optical repeaters 80-1 each having a pair of optical repeater units. Ones of the repeater unit pairs in the respective optical repeaters are connected by optical fibers to form a straight transmission line, and the others are also connected by optical fibers to form a straight transmission line. The optical repeater units at both ends are connected to an upstream device and a downstream device, respectively.

In the WDM optical signal transmission system of this embodiment, WDM optical signals each composed of a control optical signal and a plurality of controlled optical signals are transmitted in opposite directions through the straight transmission lines, respectively.

Each of the optical repeater units includes a demultiplexer for demultiplexing a WDM optical signal transmitted from an upstream optical repeater unit into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals that have undergone the processing by the processor.

Namely, the WDM optical signal transmission system of this embodiment comprises a plurality of the optical repeaters 80-1 as shown in FIG. 11(b), which are connected by optical fibers so as to form straight transmission lines. Both ends of each transmission line are connected to the wavelength multiplexer 100 and the wavelength demultiplexer 1020, respectively.

As is described above, according to the fourth embodiment of the present invention, the WDM optical signal transmission system has an independent functional block and performs independent processing with respect to one direction. That is, the combination of the optical repeaters each having a pair of optical repeater units enables the WDM optical signal transmission system to be applicable to a bidirectional communication network.

As set forth hereinabove, in accordance with the present invention, since the wavelength number information indicates the presence or absence of an optical signal for each wavelength individually, the number of wavelengths can be detected without error even when optical noise is caused in an optical repeater, and also such functions as adjustment and monitoring of the level of a wavelength division multiplexed optical signal are performed properly.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wavelength division multiplexed optical signal transmission method, comprising:
   transmitting via one or more optical repeaters a wavelength division multiplexed optical signal composed of a control optical signal and a plurality of controlled optical signals from an upstream device to a downstream device through optical fibers;
   in the optical repeater, demultiplexing a wavelength division multiplexed optical signal transmitted from the upstream device into optical signals each having a different wavelength;
   processing the controlled optical signals of different wavelengths individually based on the control optical signal that contains wavelength number information indicating the presence or absence of a controlled optical signal with respect to each wavelength;
   remultiplexing the control optical signal and the controlled optical signals that have undergone the processing to obtain a wavelength division multiplexed optical signal; and
   transmitting the wavelength division multiplexed optical signal to the downstream device, wherein:
   in the case where the wavelength number information provides a signal present indication corresponding to a controlled optical signal, when the signal has not deteriorated, the optical repeater allows the signal to pass through without changing the signal present indication of the wavelength number information, while, when the signal has deteriorated, the optical repeater once terminates the signal and regenerates a controlled optical signal to allow the new signal regenerated from the deteriorated signal to pass through without changing the signal present indication of the wavelength number information; and
   in the case where the wavelength number information provides a signal absent indication corresponding to a controlled optical signal, when receiving an optical signal from the outside, the optical repeater outputs the optical signal as the controlled optical signal and updates the wavelength number information to indicate the presence of the signal, while, when receiving no optical signal from the outside, the optical repeater terminates the controlled optical signal without changing the signal absent indication of the wavelength number information.

2. The wavelength division multiplexed optical signal transmission method claimed in claim 1, wherein the optical repeater controls functions for adjustment and monitoring of the level of a wavelength division multiplexed optical signal input thereto based on the wavelength number information from the control optical signal.

3. The wavelength division multiplexed optical signal transmission method claimed in claim 1, wherein the wavelength number information includes information on the number of multiplexed wavelengths.

4. A wavelength division multiplexed optical signal transmission method, comprising:
   transmitting wavelength division multiplexed optical signals each composed of a control optical signal and a plurality of controlled optical signals in opposite directions through transmission lines by a plurality of optical repeaters each having a pair of optical repeater units, ones of the repeater unit pairs in the respective optical repeaters being connected by optical fibers to form a ring transmission line and the others also being connected by optical fibers to form a ring transmission line, or ones of the repeater unit pairs in the respective optical repeaters being connected by optical fibers to form a straight transmission line, the others also being connected by optical fibers to form a straight transmission line and optical repeater units at both ends being connected to an upstream device and a downstream device;
   in the optical repeater unit, demultiplexing a wavelength division multiplexed optical signal transmitted from an upstream optical repeater unit into optical signals each having a different wavelength;

processing the controlled optical signals of different wavelengths individually based on the control optical signal that contains wavelength number information indicating the presence or absence of a controlled optical signal with respect to each wavelength;

remultiplexing the control optical signal and the controlled optical signals that have undergone the processing to obtain a wavelength division multiplexed optical signal; and transmitting the wavelength division multiplexed optical signal to a downstream optical repeater unit, wherein:

in the case where the wavelength number information provides a signal present indication corresponding to a controlled optical signal, when the signal has not deteriorated, the optical repeater unit allows the signal to pass through without changing the signal present indication of the wavelength number information, while, when the signal has deteriorated, the optical repeater unit once terminates the signal and regenerates a controlled optical signal to allow the new signal regenerated from the deteriorated signal to pass through without changing the signal present indication of the wavelength number information; and in the case where the wavelength number information provides a signal absent indication corresponding to a controlled optical signal, when receiving an optical signal from the outside, the optical repeater unit outputs the optical signal as the controlled optical signal and updates the wavelength number information to indicate the presence of the signal, while, when receiving no optical signal from the outside, the optical repeater unit terminates the controlled optical signal without changing the signal absent indication of the wavelength number information.

5. The wavelength division multiplexed optical signal transmission method claimed in claim 4, wherein the optical repeater unit controls functions for adjustment and monitoring of the level of a wavelength division multiplexed optical signal input thereto based on the wavelength number information from the control optical signal.

6. A wavelength division multiplexed optical signal transmission system, comprising:

an upstream device;

one or more optical repeaters; and a downstream device for transmitting via the optical repeater a wavelength division multiplexed optical signal composed of a control optical signal and a plurality of controlled optical signals from the upstream device to the downstream device through optical fibers, wherein:

the upstream device includes a receiver for receiving a control optical signal and controlled optical signals and a multiplexer for multiplexing the control optical signal and the controlled optical signals received by the receiver;

the optical repeater includes a demultiplexer for demultiplexing a wavelength division multiplexed optical signal transmitted from the upstream device into optical signals each having a different wavelength, a processor for processing the controlled optical signals of different wavelengths individually based on the control optical signal that contains wavelength number information indicating the presence or absence of a controlled optical signal with respect to each wavelength, and a multiplexer for remultiplexing the control optical signal and the controlled optical signals; and the downstream device includes a demultiplexer for demultiplexing a wavelength division multiplexed optical signal transmitted from the optical repeater and a transmitter for transmitting a control optical signal and controlled optical signals obtained by demultiplexing the wavelength division multiplexed optical signal to the outside, wherein:

in the case where the wavelength number information provides a signal present indication corresponding to a controlled optical signal, when the signal has not deteriorated, the processor of the optical repeater allows the signal to pass through without changing the signal present indication of the wavelength number information, while, when the signal has deteriorated, the processor once terminates the signal and regenerates a controlled optical signal to allow the new signal regenerated from the deteriorated signal to pass through without changing the signal present indication of the wavelength number information; and in the case where the wavelength number information provides a signal absent indication corresponding to a controlled optical signal, when receiving an optical signal from the outside, the processor outputs the optical signal as the controlled optical signal and updates the wavelength number information to indicate the presence of the signal, while, when receiving no optical signal from the outside, the processor terminates the controlled optical signal without changing the signal absent indication of the wavelength number information.

7. The wavelength division multiplexed optical signal transmission system claimed in claim 6, wherein the processor of the optical repeater controls functions for adjustment and monitoring of the level of a wavelength division multiplexed optical signal input thereto based on the wavelength number information from the control optical signal.

8. The wavelength division multiplexed optical signal transmission system claimed in claim 6, wherein the wavelength number information includes information on the number of multiplexed wavelengths.

9. A wavelength division multiplexed optical signal transmission system, comprising:

a plurality of optical repeaters each having a pair of optical repeater units which transmit wavelength division multiplexed optical signals each composed of a control optical signal; and a plurality of controlled optical signals in opposite directions through transmission lines, wherein:

ones of the repeater unit pairs in the respective optical repeaters are connected by optical fibers to form a ring transmission line, and the others are also connected by optical fibers to form a ring transmission line; or ones of the repeater unit pairs in the respective optical repeaters are connected by optical fibers to form a straight transmission line, the others are also connected by optical fibers to form a straight transmission line, and optical repeater units at both ends are connected to an upstream device and a downstream device, respectively; and the optical repeater unit includes:

a demultiplexer for demultiplexing a wavelength division multiplexed optical signal transmitted from an upstream optical repeater unit into optical signals each having a different wavelength;

a processor for processing the controlled optical signals of different wavelengths individually based on the control optical signal that contains wavelength number information indicating the presence or absence of a controlled optical signal with respect to each wavelength; and a multiplexer for remultiplexing the control optical signal and the controlled optical signals that have undergone the processing by the processor, wherein:

in the case where the wavelength number information provides a signal present indication corresponding to a controlled optical signal, when the signal has not deteriorated, the processor of the optical repeater unit allows the signal to pass through without changing the signal present indication of the wavelength number information, while, when the signal has deteriorated, the processor once terminates the signal and regenerates a controlled optical signal to allow the new signal regenerated from the deteriorated signal to pass through without changing the signal present indication of the wavelength number information; and in the case where the wavelength number information provides a signal absent indication corresponding to a controlled optical signal, when receiving an optical signal from the outside, the processor outputs the optical signal as the controlled optical signal and updates the wavelength number information to indicate the presence of the signal, while, when receiving no optical signal from the outside, the processor terminates the controlled optical signal without changing the signal absent indication of the wavelength number information.

10. The wavelength division multiplexed optical signal transmission system claimed in claim 9, wherein the processor of the optical repeater unit controls functions for adjustment and monitoring of the level of a wavelength division multiplexed optical signal input thereto based on the wavelength number information from the control optical signal.

11. An optical repeater, comprising:

a demultiplexer for demultiplexing a wavelength division multiplexed optical signal transmitted from an upstream device into optical signals each having a different wavelength;

a processor for processing the controlled optical signals of different wavelengths individually based on a control optical signal that contains wavelength number information indicating the presence or absence of a controlled optical signal with respect to each wavelength; and a multiplexer for remultiplexing the control optical signal and the controlled optical signals, wherein the optical repeater is adapted for transmitting the wavelength division multiplexed optical signal composed of the control optical signal and a plurality of the controlled optical signals from the upstream device to a downstream device through optical fibers, wherein:

in the case where the wavelength number information provides a signal present indication corresponding to a controlled optical signal, when the signal has not deteriorated, the processor of the optical repeater allows the signal to pass through without changing the signal present indication of the wavelength number information, while, when the signal has deteriorated, the processor once terminates the signal and regenerates a controlled optical signal to allow the new signal regenerated from the deteriorated signal to pass through without changing the signal present indication of the wavelength number information; and in the case where the wavelength number information provides a signal absent indication corresponding to a controlled optical signal, when receiving an optical signal from the outside, the processor outputs the optical signal as the controlled optical signal and updates the wavelength number information to indicate the presence of the signal, while, when receiving no optical signal from the outside, the processor terminates the controlled optical signal without changing the signal absent indication of the wavelength number information.

12. The optical repeater claimed in claim 11, wherein the processor of the optical repeater controls functions for adjustment and monitoring of the level of a wavelength division multiplexed optical signal input thereto based on the wavelength number information from the control optical signal.

13. The optical repeater claimed in claim 11, wherein the wavelength number information includes information on the number of multiplexed wavelengths.

14. A wavelength division multiplexed optical signal transmission system, comprising:

a plurality of optical repeaters each having a pair of optical repeater units which transmit wavelength division multiplexed optical signals each composed of a control optical signal and a plurality of controlled optical signals in opposite directions through transmission lines, wherein:

ones of the repeater unit pairs in the respective optical repeaters are connected by optical fibers to form a ring transmission line, and the others are also connected by optical fibers to form a ring transmission line; or ones of the repeater unit pairs in the respective optical repeaters are connected by optical fibers to form a straight transmission line, the others are also connected by optical fibers to form a straight transmission line, and optical repeater units at both ends are connected to an upstream device and a downstream device, respectively; and the optical repeater unit includes:

a demultiplexer for demultiplexing a wavelength division multiplexed optical signal transmitted from an upstream optical repeater unit into optical signals each having a different wavelength;

a processor for processing the controlled optical signals of different wavelengths individually based on the control optical signal that contains wavelength number information indicating the presence or absence of a controlled optical signal with respect to each wavelength; and a multiplexer for remultiplexing the control optical signal and the controlled optical signals that have undergone the processing by the processor, wherein:

in the case where the wavelength number information provides a signal present indication corresponding to a controlled optical signal, when the signal has not deteriorated, the processor of the optical repeater unit allows the signal to pass through without changing the signal present indication of the wavelength number information, while, when the signal has deteriorated, the processor once terminates the signal and regenerates a controlled optical signal to allow the new signal regenerated from the deteriorated signal to pass through without changing the signal present indication of the wavelength number information; and in the case where the wavelength number information provides a signal absent indication corresponding to a controlled optical signal, when receiving an optical signal from the outside, the processor outputs the optical signal as the controlled optical signal and updates the wavelength number information to indicate the presence of the signal, while, when receiving no optical signal from the outside, the processor terminates the controlled optical signal without changing the signal absent indication of the wavelength number information.

15. The transmission system claimed in claim 14, wherein the processor of the optical repeater unit controls functions for adjustment and monitoring of the level of a wavelength division multiplexed optical signal input thereto based on the wavelength number information from the control optical signal.

* * * * *

UNITED STATES PATENT AND TRADEMARK OFFICE
CERTIFICATE OF CORRECTION

PATENT NO. : 7,627,256 B2 Page 1 of 1
APPLICATION NO. : 11/168332
DATED : December 1, 2009
INVENTOR(S) : Koichi Tokunaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Twenty-first Day of December, 2010

David J. Kappos
*Director of the United States Patent and Trademark Office*